G. G. BUCKLAND.
TIRE HOLDER.
APPLICATION FILED APR. 18, 1916.
1,239,254. Patented Sept. 4, 1917.
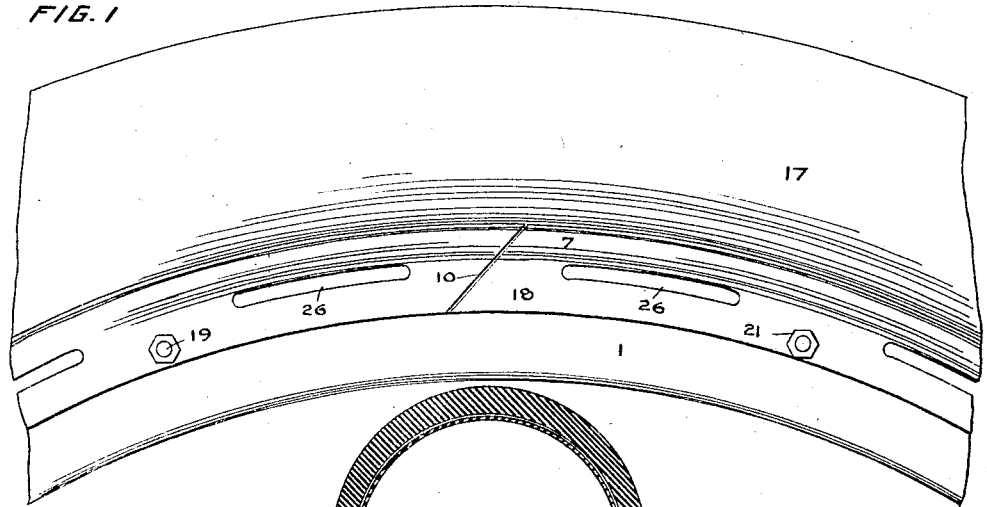
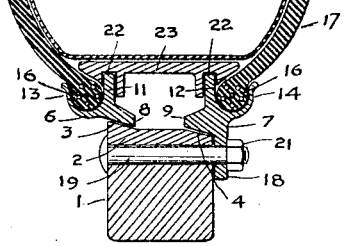
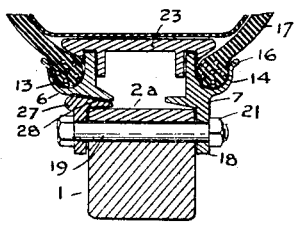 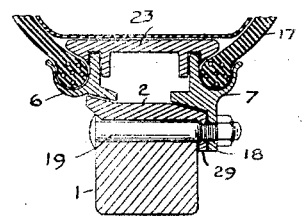
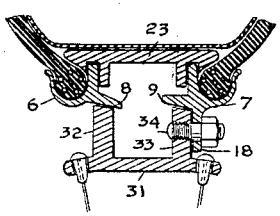 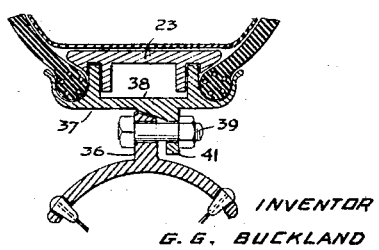
INVENTOR
G. G. BUCKLAND
PER
F. M. Wright
ATT'Y.

UNITED STATES PATENT OFFICE.

GEORGE GARDNER BUCKLAND, OF SAN FRANCISCO, CALIFORNIA.

TIRE-HOLDER.

1,239,254.   Specification of Letters Patent.   Patented Sept. 4, 1917.

Application filed April 18, 1916. Serial No. 91,899.

*To all whom it may concern:*

Be it known that I, GEORGE G. BUCKLAND, a citizen of the United States, residing at San Francisco, in the county of San Francisco and State of California, have invented new and useful Improvements in Tire-Holders, of which the following is a specification.

The present invention relates to improvements in pneumatic tire holders for vehicle wheels. The object of the invention is to provide an improved form of tire holder which will not cut the rim when the inner tube is deflated, and which can be quickly detached from, and attached to, a wheel, so that a driver of an automobile on the road can quickly remove a tire which has been punctured or burst, and can replace it with another tire already inflated with a tire holder attached thereto.

In the accompanying drawing, Figure 1 is a broken side elevation of a portion of a wheel constructed in accordance with my invention; Fig. 2 is a cross-sectional view thereof; Figs. 3, 4, 5 and 6 are broken cross-sectional views of modified forms of the invention.

Referring to the drawing, 1 indicates the wooden felly of a wheel. I surround said felly with an endless felly band 2, the marginal portions of the outer surface of which are conical, as shown at 3, 4, the inner conical portion 3 being higher than the outer conical portion 4. Surrounding the inner and outer conical portions 3, 4, respectively, are inner and outer tire holders 6, 7. Said tire holders comprise inner members 8, 9, extending in opposite directions toward each other and having their inner surfaces of the same slope relative to the axis of the wheel as the conical marginal portions 3, 4, members 11, 12 extending outwardly in approximately the same planes as the side surfaces of the felly, and hook-shaped members 13, 14, forming, with the members 11, 12, annular cavities or receptacles to receive the cable bases 16 of the casing 17 of the pneumatic tire, which is here shown as of the cable base type. The outer tire holder 7 is also formed with an annular flange 18 extending inwardly closely adjacent to the outer surface of the felly. Through the felly and through this annular flange 18 extend bolts 19 secured by nuts 21 bearing against the flange 18, the heads of said bolts bearing against the inner sides of the felly and felly band 2. The outwardly extending members 11, 12 are received in annular channels 22 formed in the inner surface of an endless ring 23 within the casing 17. The tire holders 6 and 7 are cut through obliquely, as shown at 10, to permit them to spring into the channels 22 in the ring 23.

Since the ring 23 is uncut and channeled on its inner surface and the tire holders are firmly secured in the channels of said ring 23, the parts 23, 6 and 7 operate in the same manner as a one-piece rim, and form a combination rim, and may be so referred to in this specification.

It will be seen that, with this construction, the entire rim and tire can be readily and quickly removed by unscrewing the nuts 21.

The outer tire holder 7 is formed with a number of circumferentially extending slots 26 in which a chisel can be inserted to aid in removing the rim.

In the modification of the invention shown in Fig. 3, the felly band 2ª is not formed with the conical portions, but is cylindrical throughout its entire width, and there is provided a ring 27 against the inner side of the felly and having a wedge-shaped or conical extension 28 surrounding the felly-band, through which ring 27 the bolts 19 extend, as well as through the felly and flange 18.

In the modification of the invention shown in Fig. 4, the felly band 2 is formed with an inwardly extending flange 29 through which the bolts 19 extend, as well as through the felly and flange 18.

Figs. 5 and 6 show the invention applied to a wire wheel rim.

In Fig. 5 the wire wheel rim 31 is formed with two outwardly extending flange-like portions 32, 33, each of which is conical on its outer edge, the conical members 8 and 9 of the inner and outer holders 6 and 7 resting against said conical outer edges. A stud bolt 34, tapped in the flange-like portion 33 extends through the flange 18 of the outer tire holder 7.

In the form of the invention shown in Fig. 6, the wire wheel rim is formed with a single central outwardly extending flange-like portion 36, the outer edge of which is conical and engages a conical portion of the inner surface of a tire holder 37, which, formed in one piece, takes the place of the inner and outer tire holders 6 and 7, a central web 38 connecting members, which are substantially of the same form, and serve the said purpose, as the members 8, 9, 11, 12, 13, 14 of the tire holders 6 and 7. Bolts 39 extend through said flange-like portion 36 and through a flange-like member 41 extending inwardly from the web 38.

To apply the tire to the wheel, the endless rim 23 is first held inside the tire casing 17, then one of the cut ends of either of the tire holders 6 or 7 is sprung inwardly to permit it to slip within one cable base of the tire casing 17 and into the proper channel 22 of the ring 23, and the end is pressed outward, as shown at 40 in Fig. 1, next the other tire holder and is put in place in the same manner in the other channel, and then the tire, with the ring and tire holders, is ready to slip on the felly band or the tire wheel rim and be tightened by the bolts.

The tire holders 6 and 7 can be modified to receive the edges of tire casings of the hook type, or to receive solid tires.

It will readily be seen that, if the inner tube should be deflated, no rim cutting would result therefrom, which is a common defect in tires of the present construction.

I am aware that it is not new to provide a tire holder which can be quickly removed from, and attached to, a wheel, but such tire holders have always heretofore, so far as my knowledge extends, been of a construction in which the tire is cut when deflated by a vehicle running thereon. I am also aware that it is not new to provide what is called a "no-rim-cut" tire holder. But no such "no-rim-cut" tire holder has been so constructed that it could be detached from, and attached to, a wheel quickly, so that in case of accident to the tire, the driver can quickly detach it and replace it with a new tire already inflated for use.

I am the first, so far as I am aware, to provide a tire holder of such construction that, when deflated, the tire casing will not be cut by running the vehicle on it, and can also be quickly attached to, and detached from, the wheel.

I claim:—

1. Means for attaching a tire to a wheel, comprising the combination of a ring surrounding the wheel, the inner surface of which on one side of the wheel is channel-shaped, an annular channel-shaped tire holder, the inner side of which fits in the channel of said ring, the channel-shaped portion of said tire holder being arranged to receive a base of a tire casing and having formed integral therewith a member extending inwardly around the periphery of the wheel and arranged to contact therewith to secure said member on said wheel, and means for securing the member on the wheel.

2. Means for attaching a tire to a wheel, comprising the combination of a ring surrounding the wheel, the inner surface of which on one side of the wheel is channel-shaped, an annular channel-shaped tire holder, the inner side of which fits in the channel of said ring, the channel-shaped portion of said tire holder being arranged to receive a base of a tire casing and having formed integral therewith a member extending inwardly around the periphery of the wheel and arranged to contact therewith to secure said member on said wheel, and having also a member arranged to abut against a side of the wheel, and means for securing the member on the wheel.

3. In means for attaching a tire to a wheel, the combination of a ring, the inner surface of which on both sides of the wheel is channel-shaped, an annular channel-shaped tire holder on each side of the wheel, the inner side of which fits in the corresponding channel of said ring, each channel-shaped portion of said tire holder being arranged to receive a base of a tire casing and having formed integral therewith a member extending inwardly around the periphery of the wheel and arranged to contact therewith to secure said member on said wheel, and means for securing the member on the wheel.

In testimony whereof I have hereunto set my hand in the presence of two subscribing witnesses.

GEORGE GARDNER BUCKLAND.

Witnesses:
F. M. WRIGHT,
D. B. RICHARDS.